(12) United States Patent
Roberts

(10) Patent No.: US 6,521,141 B1
(45) Date of Patent: *Feb. 18, 2003

(54) REFRIGERANT COMPOSITION

(75) Inventor: Neil A. Roberts, Bristol (GB)

(73) Assignee: Rhodia Limited, Hertfordshire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/308,910

(22) PCT Filed: Nov. 28, 1997

(86) PCT No.: PCT/GB97/03286

§ 371 (c)(1),
(2), (4) Date: Sep. 30, 1999

(87) PCT Pub. No.: WO98/22702

PCT Pub. Date: Jun. 4, 1998

(30) Foreign Application Priority Data

Nov. 28, 1996 (GB) .............................. 9624818

(51) Int. Cl.$^7$ .................................. C09K 5/04
(52) U.S. Cl. ......................................... 252/67; 252/68
(58) Field of Search ...................... 252/67, 68

(56) References Cited

U.S. PATENT DOCUMENTS 5,370,811 A    12/1994  Yoshida et al.
5,370,812 A    12/1994  Brown
5,417,871 A     5/1995  Minor et al.

FOREIGN PATENT DOCUMENTS

| | | |
|---|---|---|
| EP | 0 399 817 B1 | 11/1990 |
| EP | 0 565 265 A1 | 10/1993 |
| GB | 2 291 884 A | 2/1996 |
| IT | MI95 A 002627 | 10/1996 |
| JP | 1-139675 | 6/1989 |
| JP | 4-18485 | 1/1992 |
| WO | WO 94/18282 | 8/1994 |
| WO | WO 95/08602 | 3/1995 |
| WO | WO 96/37571 | 11/1996 |

*Primary Examiner*—Margaret Einsmann
(74) *Attorney, Agent, or Firm*—Finnegan, Henderson, Farabow, Garrett & Dunner, L.L.P.

(57) ABSTRACT

A non-azeoptropic refrigerant composition having a vapour pressure at −20° C. of from 70 to 190 kPa (0.7 to 1.9 bar), at +20° C. of from 510 to 630 kPa (5.1 to 6.3 bar) and at +60° C. of from 1620 to 1740 kPa (16.2 to 17.4 bar), which composition comprises:

(a) 1,1,2,2-tetrafluoroethane (R134), 1,1,1,2-tetrafluoroethane (R134a), difluoromethoxytrifluoromethane (E125) or a mixture of two or more thereof, in an amount of from 60 to 990 by weight, based on the weight of the composition;

(b) from 1 to 10% by weight, based on the weight of the composition, of an unsubstituted hydrocarbon of the formula $C_nH_m$ in which n is at least 4 and m is at least 2n−2; and, (c) up to 39% by weight, based on the weight of the composition, of a vapour pressure depressant.

24 Claims, No Drawings

REFRIGERANT COMPOSITION

The present invention relates to a refrigerant composition suitable for use in compression refrigeration.

Chlorofluorocarbons (CFCs), such as dichlorodifluoromethane (CFC-12), have traditionally been used as refrigerants for compression refrigeration systems. Refrigeration systems that use CFCs as refrigerants generally use mineral oils to lubricate the compressor. These lubricating mineral oils are also known as napthalenic oils. A lubricating mineral oil is typically a lube oil fraction having a viscosity index of from −300 to 140, which has been dewaxed, deasphalted and hydrogenated. The mineral oil may contain up to 15% by weight of an additive such as an antioxidant or a corrosion inhibitor. Typically, it has a kinematic viscosity at 40° C. of from 10 $mm^2/s$ to 220 $mm^2/s$ (10 cSt to 220 cSt).

In compression refrigeration systems it is desirable that all the lubricant should remain in the compressor to ensure that the compressor is adequately lubricated. In practice, however, an amount of lubricant is invariably aspirated into the surrounding pipework of the refrigeration cycle. If the lubricant is insoluble in the refrigerant, there is a danger that it will separate from the refrigerant and fail to return to the compressor. In this event, the compressor becomes inadequately lubricated. Refrigeration systems that use CFCs such as CFC-12 generally use mineral oil lubricants because such CFCs are soluble with the mineral oils throughout the entire range of refrigeration temperatures.

However, recent concern regarding depletion of the ozone layer by CFCs has led to the use of CFCs being restricted. CFC-12 has an ozone depletion potential of 0.9, where the ozone depletion potential of trichloromethane is defined to be 1. Alternative refrigerants are therefore required. Perfluorocarbons are not suitable as alternative refrigerants as they have a high global warming potential (GWP) and excessive atmospheric lifetimes. The GWP is the time-integrated commitment to climate forcing from the instantaneous release of 1 kg of refrigerant expressed relative to that from 1 kg of carbon dioxide, which is taken as having a GWP of 1.

1,1,1,2-tetrafluoroethane (R134a) is becoming widely used as an alternative to chlorofluorocarbon refrigerants. It has substantially no ozone depletion potential. It has a GWP, measured on the basis of a 100 year integrated time horizon, of about 1300. However, R134a has the disadvantage that it is substantially immiscible with the mineral oil lubricants used in existing refrigeration equipment. In other words, R134a cannot be used by itself in such equipment.

Various attempts have been made to find lubricants which can be used with fluorinated hydrocarbons such as R134a. Various polyolesters and polyalkylene glycols have been proposed for this purpose.

Unfortunately, however, these new lubricants are considerably more expensive than the conventional mineral oil lubricants. Also, they are often hydroscopic and absorb atmospheric moisture. Clearly, in order to minimise the changes necessary to the equipment or operating conditions when replacing CFCs in compression refrigeration systems with alternative refrigerants, it is desirable to be able to use the conventional mineral oils as used with the CFCs.

There is therefore a demand for a refrigerant which possesses the desirable properties of R134a but which can be used with the conventional mineral oil lubricants as used with the CFCs. Existing refrigerants which can be used with the mineral oil lubricants are invariably deficient in some other respect.

A novel refrigerant composition has now been devised, according to the present invention, which has substantially no ozone depletion potential, which is sufficiently compatible with the conventional mineral oil lubricants to be used with them and which has an operating performance equal to or superior to fluorinated hydrocarbons such as R134a and chlorofluorocarbons such as CFC-12.

The present invention provides a non-azeotropic refrigerant composition having a vapour pressure at −20° C. of from 70 to 190 kPa (0.7 to 1.9 bar), at +20° C. of from 510 to 630 kPa (5.1 to 6.3 bar) and at +60° C. of from 1620 to 1740 kPa (16.2 to 17.4 bar), which composition comprises:

(a) 1,1,2,2-tetrafluoroethane (R134), 1,1,1,2-tetrafluoroethane (R134a), difluoromethoxytrifluoromethane (E125) or a mixture of two or more thereof, in an amount of from 60 to 99% by weight, based on the weight of the composition;

(b) from 1 to 10% by weight, based on the weight of the composition, of an unsubstituted hydrocarbon of the formula $C_nH_m$ in which n is at least 4 and m is at least 2n−2; and, (c) up to 39% by weight, based on the weight of the composition, of a vapour pressure depressant, Typically, a composition is "non-azeotropic" if, at any given pressure and temperature, the composition of the liquid and the composition of the vapour above the liquid are substantially not equal. Thus, any loss of vapour from a non-azeotropic composition will result in a composition change of the remaining liquid. In contrast, loss of vapour from an azeotrope does not result in a change of liquid composition.

Preferred non-azeotropic compositions are those in which, after about 50% of the composition is removed such as by evaporation or boiling off, the difference in the original composition and the composition remaining is more than about 2%, more preferably more than about 10%.

Typically, component (a) is present in an amount of from 70 to 95%, preferably from 80 to 90%, more preferably from 82 to 86%, by weight based on the composition.

Component (b) is an unsubstituted hydrocarbon of the formula $C_nH_m$, in which n is at least 4 and m is at least 2n−2. Typically, n is from 4 to 6, preferably 4 or 5. Typically, the unsubstituted hydrocarbon has no triple bonds. Preferably, the unsubstituted hydrocarbon is saturated except for one double bond. More preferably, the unsubstituted hydrocarbon is fully saturated.

Typically, the unsubstituted hydrocarbon is methylenecyclopropane, 1-butene, cis and trans-2-butene, butane, 2-methyl propane, cyclopentene, cyclopentane, 2-methyl-1-butene, 2-methyl-2-butene, 3-methyl-1-butene, 1-pentene, cis and trans-2-pentene, 2-methylbutane, pentane or a mixture of two or more thereof. Preferably, it is cyclobutane, more preferably n-butane (R600) or 2-methylpropane (R600a).

Typically, the unsubstituted hydrocarbon is present in an amount of from 1 to 8%, preferably from 2 to 6%, more preferably from 2 to 5%, by weight based on the composition.

The unsubstituted hydrocarbon serves to improve the compatibility of the refrigerant composition of the invention with mineral oil lubricants. Unfortunately it increases the vapour pressure of the composition of the invention. It may also increase the flammability of the composition of the invention.

Accordingly, component (c) is required in order to reverse the increase in vapour-pressure caused by component (b). Component (c) is a vapour-pressure depressant, i.e. a compound capable of lowering the vapour pressure of the refrigerant composition.

Typically, the vapour-pressure depressant is 1,1-difluoroethane, 1,1,1,2,2,3,3-heptafluoropropane, 1,1,1,2,3,3,3-heptafluoropropane, octafluorocyclobutane, 1,1,1,2,2-pentafluoropropane, 1,1,2,2,3-pentafluoropropane, trifluoromethoxymethane, trifluoromethoxypentafluoroethane, difluoromethoxypentafluoroethane, trifluoromethoxy-1,2,2,2-tetrafluoroethane, fluoromethoxytrifluoromethane, difluoromethoxymethane, pentafluoroethoxypentafluoroethane, difluoromethoxydifluoromethane, trifluoromethoxy-2,2,2-trifluoroethane, fluoromethoxymethane, difluoromethoxy-1,2,2,2-tetrafluoroethane, fluoromethoxyfluoromethane, difluoromethoxy-2,2,2-trifluoroethane, methoxy-2,2,2-trifluoroethane, methoxy-1,1,2,2-tetrafluoroethane or a mixture of two or more thereof. Preferably it is 1,1-difluoroethane (R152a), 1,1,1,2,2,3,3-heptafluoropropane (R227ca), 1,1,1,2,3,3,3-heptafluoropropane (R227ea), 1,1,1,2,2-pentafluoropropane (R245cb), octafluorocyclobutane (RC-318) or a mixture of two or more thereof.

Component (c) is typically present in an amount of from 4 to 29%, preferably from 8 to 18%, more preferably from 12 to 16%, by weight based on the composition. The amount of vapour-pressure depressant depends on the nature and amount of components (a) and (b). If a large amount of component (b) is present (i.e. more than about 5% by weight, based on the composition), then a correspondingly greater amount of component (c) (or of R134) will be required to achieve an appropriate vapour pressure.

The amount of component (c), if any, should be such that the composition has a vapour pressure at −20° C. of from 70 to 190 kPa, preferably from 90 to 190 kPa, more preferably from 120 to 180 kPa, at 20° C. of from 510 to 630 kPa, preferably from 530 to 630 kPa, more preferably from 580 to 620 kPa, and at 60° C. of from 1620 to 1740 kPa, preferably from 1630 to 1720 kPa, more preferably from 1650 to 1700 kPa. This amount can, of course, be readily determined by routine experiment. It is particularly preferred that the vapour pressure depressant is present in an amount so that the composition has a vapour pressure substantially equal to that of R134a.

When the vapour-pressure depressant is present in an amount of more than 20% by weight, based on the weight of the composition, it is preferred that the vapour-pressure depressant comprises two or more compounds, each of which being present in an amount of 20% by weight or less, based on the weight of the composition.

The refrigerant composition of the invention may further comprise component (d), a flammability supressant. Preferably, the composition comprises a flammability supressent when the unsubstituted hydrocarbon (b) is present in an amount greater than about 2% by weight based on the composition. It is particularly preferred that the composition comprises a flammability supressent when the unsubstituted hydrocarbon (b) is present in an amount of about 3% by weight or more based on the composition. Thus compositions which do not contain a flammability supressent typically contain less than 3%, for example from 1 to 2% by weight of the hydrocarbon (b) based on the composition.

Typically the flammability supressant is 1,1,1,2,2,3,3-heptafluoropropane, 1,1,1,2,3,3,3-heptafluoropropane, octafluorocyclobutane, octafluoropropane, trifluoromethoxytrifluoromethane, difluoromethoxytrifluoromethane, trifluoromethoxypentafluoroethane, difluoromethoxypentafluoroethane, trifluoromethoxy-1,2,2,2-tetrafluoroethane, or a mixture of two or more thereof. The vapour-pressure depressant may also function as a flammability supressant. Vapour-pressure depressants which also function as flammability supressants include 1,1,1,2,2,3,3-heptafluoropropane (R227ca), 1,1,1,2,3,3,3-heptafluoropropane (R227ea), octafluorocyclobutane (RC-318) trifluoromethoxypentafluoroethane (E218), difluoromethoxypentafluoroethane (E227ea) and trifluoromethoxy-1,2,2,2-tetrafluoroethane (E227ca).

If component (d) is present, components (c) and (d) are typically together present in an amount of up to 39%, preferably from 4 to 29%, more preferably from 8 to 18%, most preferably from 12 to 16%, by weight based on the composition. Typically, when component (d) is present, component (c) is present in an amount of up to 19% by weight, based on the composition and component (d) is present in an amount of up to 20% by weight, based on the composition.

When the flammability supressant and the vapour-pressure depressant are together present in an amount of 20% by weight or more, based on the weight of the composition, it is preferred that no single compound comprised in the flammability supressant or vapour-pressure depressant is present in an amount of 20% by weight or more, based on the weight of the composition.

Clearly, any flammability supressant or vapour-pressure depressant used must not render the refrigerant composition unsuitable for use in compression refrigeration. Thus, the choice of vapour-pressure depressant or flammability supressant should not be such as to significantly decrease solubility in the mineral oil lubricants. Typically, addition of the vapour-pressure depressant or flammability supressant causes no more than a 10%, preferably no more than a 5%, decrease in the solubility of the composition in the mineral oil lubricants.

Typically, any flammability supressant or vapour-pressure depressant used should have a GWP, measured on the basis of a 100 year integrated time horizon, of less than 5,000, preferably less than 4,000, most preferably less than 3,500.

In addition, any flammability supressant or vapour-pressure depressant used should not impart undue toxicity to the refrigerant composition. The Occupational Exposure Limit (OEL) of the refrigerant composition of the invention is typically from 800 to 1000, preferably from 850 to 950, ppm.

The flammability supressant and vapour pressure depressant should have substantially no ozone depletion potential.

Furthermore, the flammability supressant and/or vapour-pressure depressant should not unduly decrease the operating performance of the refrigerant composition of the invention. Typically, the cooling capacity of a compression refrigeration apparatus, using, as refrigerant, the composition of the invention, is not more than 10% less, preferably not more than 5% less, more preferably not less than, the cooling capacity of an identical compression refrigeration apparatus, operating under identical conditions, using, as refrigerant, CFC-12 or R134a.

Typically, the refrigerant composition of the invention contains substantially no lubricant such as polyalkylene glycol.

Typically, the energy consumption of a compression refrigeration apparatus using, as refrigerant, the composition of the invention, is not more than 10% less, preferably not more than 5% less, more preferably not less than, the energy consumption of an identical compression refrigeration apparatus, operating under identical conditions, using, as refrigerant, CFC-12 or R134a.

The following compositions are particularly preferred:
1) compositions in which component (a) is R134 and/or R134a, component (b) is R600 and/or R600a and component (c) is R152a, R227ca, R227ea or a mixture of two or more thereof;
2) compositions in which component (a) is R134 and/or R134a, component (b) is R600 and/or R600a and component (c) is R152a;
3) Compositions in which component (a) is R134 and/or R134a, component (b) is R600 and/or R600a and component (c) is R227ca and/or R227ea.

Typically, in the refrigerant composition of the present invention, the ratio of the total number of fluorine atoms in the composition to the total number of hydrogen atoms in the composition is desirably at least 1.25:1, preferably at least 1.5:1, more preferably at least 2:1. Typically, the refrigerant composition has a lower flammable limit (LFL) of more than 7% v/v in air, preferably, a LFL of more than 14% v/v in air. Most preferably, the refrigerant composition is non-flammable.

Preferably, the refrigerant composition of the present invention has a vapour pressure substantially equal to that of R134a. R134a has a vapour pressure at −20° C. of about 134 kPa (5 psi.g), at 20° C. of about 572 kPa (68 psi.g) and at 60° C. of about 168 kPa (229 psi.g). Typically, the composition of the invention has a vapour pressure not exceeding ±60 kPa (0.6 bar), preferably not exceeding ±40 kPa (0.4 bar) of that of R134a between −30° C. and +60° C.

The refrigerant composition of the invention has substantially no ozone depletion potential. Typically, it has a global warming potential (GWP), measured on the basis of a 100 year integrated time horizon, of less than 2000, preferably less than 1600, more preferably less than 1300.

The refrigerant composition of the present invention is preferably used in a domestic refrigeration apparatus. Typically, it is used in a compression refrigeration apparatus which contains not more than 1 kg of refrigerant.

The present invention also provides a process of producing refrigeration, comprising condensing a composition of the invention and thereafter evaporating the composition in the vicinity of a body to be cooled.

The refrigerant composition of the present invention can be prepared by transferring the individual components by autogenous pressure into an initially evacuated pressure vessel, in order of ascending vapour pressure at room temperature. The amount of each component can be checked by weighing the vessel and contents before and after transferring it.

The refrigerant composition of the present invention is advantageous as it does not deplete the ozone layer, it has a low global warming potential (GWP) relative to CFC-12 or R134a, it is compatible with mineral oil lubricants and it has an operating performance equal to or superior to conventional refrigerants such as R134a and CFC-12.

The refrigerant composition of the present invention is compatible with the mineral oil lubricants as used with CFC refrigerants. Prior to the present invention it was thought that, for a refrigerant and lubricant to be compatible, the liquid phases must be miscible. However, it has now surprisingly been found that satisfactory results are achieved if gaseous refrigerant is at least partly soluble in the liquid lubricant. Although the refrigerant composition of the present invention is not fully miscible with mineral oil lubricants when in its liquid phase, in the gaseous phase it is partially soluble in the mineral oil. The refrigerant composition of the invention is thus compatible with mineral oil lubricants.

The refrigerant composition also has a high operating performance. Refrigeration systems containing the composition of the present invention are up to 10% more efficient than refrigeration systems containing conventional refrigerants.

It is surprising that the above advantages are achieved by the refrigerant composition of the present invention because the refrigerant composition is a blend of fluorohydrocarbons and hydrocarbons rather than a single compound. Prior to the present invention it was thought to be undesirable to use non-azeotropic mixtures as refrigerants as these mixtures show a temperature glide. A temperature glide of a mixture is the absolute value of the difference between the starting and ending temperatures of the gas/liquid phase change by the mixture. It can be measured by determining the difference between the bubble point of the mixture (the temperature at which the mixture of liquids starts to boil) and the dew point of a corresponding mixture of gases (the temperature at which the mixture of gases starts to condense).

Temperature glide was thought to lead to variable temperatures in the evaporator of a compression refrigeration system and hence was thought to be undesirable. However, although the refrigerant compositions of the present invention are found to have up to a 9 K temperature glide when tested in the laboratory, it has surprisingly been found that the temperature of an evaporator of a domestic refrigeration system containing the refrigerant composition of the present invention is substantially constant.

The following Examples illustrate the invention.

EXAMPLES 1 TO 6

100 g of refrigerant composition was prepared in each case by mixing together varying amounts of compounds in a 1000 cm$^3$ pressure vessel. The amounts of each compound used are shown in Table 1.

TABLE 1

| | Amount of R134a/10 | Amount of R152a/10 | Amount of R227ea/10 | Amount of R227ca/10 | Amount of R600/10 | Amount of R600a/10 |
|---|---|---|---|---|---|---|
| EX. 1 | 82.0 g | 12.5 g | 0 | 0 | 0 | 5.5 g |
| EX. 2 | 84.5 g | 12.5 g | 0 | 0 | 0 | 3.0 g |
| EX. 3 | 85 g | 5 g | 5 | 0 | 5 | 0 |
| EX. 4 | 75 g | 5 g | 18 | 0 | 0 | 2 |
| EX. 5 | 75 g | 0 | 12 | 12 | 1 | 0 |
| EX. 6 | 85.5 g | 6 g | 6g | 0 | 0 | 2.5 g |

EXAMPLE 7

The vapour pressure of the refrigerant composition of Example 1 was measured at varying temperature using a 300 cm$^3$ internal volume stainless steel cylinder, fitted with a calibrated Bourdon gauge suspended in a temperature controlled bath containing a glycol solution. The temperatures were determined using a calibrated platinum resistance thermometer.

The results are shown in Table 2.

TABLE 2

| Temperature/° C. | Saturated Bubble Point Vapour Pressure/kPA | |
|---|---|---|
| | Example 1 | R134a |
| −40.0 | 72.2 | 53.6 |
| −39.0 | 75.5 | 56.3 |
| −38.0 | 78.9 | 59.1 |
| −37.0 | 82.4 | 62.0 |
| −36.0 | 86.1 | 65.1 |
| −35.0 | 89.9 | 68.2 |
| −34.0 | 93.8 | 71.5 |
| −33.0 | 97.9 | 74.9 |
| −32.2 | 101.3 | 78.5 |
| −31.0 | 106.5 | 82.2 |
| −30.0 | 111.0 | 86.0 |
| −29.0 | 115.7 | 90.0 |
| −28.0 | 120.5 | 94.1 |
| −27.0 | 125.4 | 98.4 |
| −26.0 | 130.6 | 102.8 |
| −25.0 | 135.9 | 107.4 |
| −24.0 | 141.4 | 112.1 |
| −23.0 | 147.0 | 117.0 |
| −22.0 | 152.8 | 122.1 |
| −21.0 | 158.8 | 127.4 |
| −20.0 | 165.0 | 132.9 |
| −19.0 | 171.4 | 138.5 |
| −18.0 | 178.0 | 144.4 |
| −17.0 | 184.8 | 150.4 |
| −16.0 | 191.7 | 156.7 |
| −15.0 | 198.9 | 163.1 |
| −14.0 | 206.3 | 169.8 |
| −13.0 | 213.9 | 176.7 |
| −12.0 | 221.8 | 183.8 |
| −11.0 | 229.8 | 191.1 |
| −10.0 | 238.1 | 198.7 |
| −9.0 | 246.6 | 206.5 |
| −8.0 | 255.3 | 214.5 |
| −7.0 | 264.3 | 222.8 |
| −6.0 | 273.6 | 231.4 |
| −5.0 | 283.1 | 240.2 |
| −4.0 | 292.8 | 249.3 |
| −3.0 | 302.8 | 258.7 |
| −2.0 | 313.1 | 268.3 |
| −1.0 | 323.6 | 278.2 |
| 0.0 | 334.4 | 288.4 |
| 1.0 | 345.5 | 298.9 |
| 2.0 | 356.8 | 309.8 |
| 3.0 | 368.5 | 320.9 |
| 4.0 | 380.4 | 332.3 |
| 5.0 | 392.7 | 344.1 |
| 6.0 | 405.2 | 356.1 |
| 7.0 | 418.1 | 368.6 |
| 8.0 | 431.2 | 381.3 |
| 9.0 | 444.7 | 394.4 |
| 10.0 | 458.5 | 407.9 |
| 11.0 | 472.6 | 421.7 |
| 12.0 | 487.1 | 435.8 |
| 13.0 | 501.9 | 450.4 |
| 14.0 | 517.0 | 465.3 |
| 15.0 | 532.5 | 480.6 |
| 16.0 | 548.3 | 496.3 |
| 17.0 | 564.5 | 512.4 |
| 18.0 | 581.1 | 529.0 |
| 19.0 | 598.0 | 545.9 |
| 20.0 | 615.3 | 563.2 |
| 21.0 | 633.0 | 581.0 |
| 22.0 | 651.0 | 599.2 |
| 23.0 | 669.5 | 617.9 |
| 24.0 | 688.3 | 637.0 |
| 25.0 | 707.5 | 656.5 |
| 26.0 | 727.2 | 676.6 |
| 27.0 | 747.2 | 697.1 |
| 28.0 | 767.7 | 718.0 |
| 29.0 | 788.5 | 739.5 |
| 30.0 | 809.8 | 761.4 |
| 31.0 | 831.6 | 783.9 |

TABLE 2-continued

| Temperature/° C. | Saturated Bubble Point Vapour Pressure/kPA | |
|---|---|---|
| | Example 1 | R134a |
| 32.0 | 853.7 | 806.8 |
| 33.0 | 876.3 | 830.3 |
| 34.0 | 899.4 | 854.3 |
| 35.0 | 922.9 | 878.8 |
| 36.0 | 946.9 | 903.9 |
| 37.0 | 971.3 | 929.5 |
| 38.0 | 996.2 | 955.7 |
| 39.0 | 1021.5 | 982.4 |
| 40.0 | 1047.4 | 1009.7 |
| 41.0 | 1073.7 | 1037.6 |
| 42.0 | 1100.5 | 1066.1 |
| 43.0 | 1127.8 | 1095.1 |
| 44.0 | 1155.6 | 1124.8 |
| 45.0 | 1183.9 | 1155.1 |
| 46.0 | 1212.7 | 1185.9 |
| 47.0 | 1242.0 | 1217.5 |
| 48.0 | 1271.9 | 1249.6 |
| 49.0 | 1302.2 | 1282.4 |
| 50.0 | 1333.1 | 1315.8 |
| 51.0 | 1364.6 | 1349.9 |
| 52.0 | 1396.5 | 1384.7 |
| 53.0 | 1429.1 | 1420.01 |
| 54.0 | 1462.1 | 1456.2 |
| 55.0 | 1495.8 | 1493.0 |
| 56.0 | 1530.0 | 1530.5 |
| 57.0 | 1564.7 | 1568.7 |
| 58.0 | 1600.1 | 1607.6 |
| 59.0 | 1636.0 | 1647.3 |
| 60.0 | 1672.5 | 1687.6 |

EXAMPLE 8

The vapour pressure of the refrigerant composition of Example 2 was measured at varying temperature in the same way as in Example 7. The results are shown in Table 3.

EXAMPLE 9

The vapour pressure of the refrigerant composition of Example 6 was measured at varying temperature in the same way as in Example 7. The results are shown in Table 4.

EXAMPLE 10

The global warming potentials (GWPs) of the compositions of Examples 2 to 6 were calculated on a mass ratio basis, i.e. by taking the sum of the products of the global warming potentials of each component of the composition in question with the mass ratio of that component in the composition Thus, the GWP of the composition of Example 2 is calculated as follows:

| Component of Example 2 | Mass Ratio | GWP | Mass Ratio × GWP |
|---|---|---|---|
| R134a | 0.845 | 1300 | 1098.5 |
| R152a | 0.125 | 140 | 17.5 |
| R600a | 0.030 | 3 | 0.09 |
| GWP of composition of Example 2 = 1098.5 + 17.5 + 0.09 = 1116.09 | | | |

The global warming potentials of R134a and CFC-12 are provided as comparisons (data taken from BS 4434, 1995). The results are shown in Table 5.

TABLE 3

| Temperature/° C. | Saturated Bubble Point Vapour Pressure/kPa | |
|---|---|---|
| | Example 2 | R134a |
| −40 | 69.6 | 53.6 |
| −39 | 72.8 | 56.3 |
| −38 | 76.2 | 59.1 |
| −37 | 79.6 | 62.0 |
| −36 | 83.2 | 65.1 |
| −35 | 86.9 | 68.2 |
| −34 | 90.7 | 71.5 |
| −33 | 94.7 | 74.9 |
| −32 | 98.8 | 78.5 |
| −31.4 | 101.3 | 80.7 |
| −31 | 103.1 | 82.2 |
| −30 | 107.5 | 86.0 |
| −29 | 112.1 | 90.0 |
| −28 | 116.8 | 94.1 |
| −27 | 121.7 | 98.4 |
| −26 | 126.7 | 102.8 |
| −25 | 131.9 | 107.4 |
| −24 | 137.3 | 112.1 |
| −23 | 142.8 | 117.0 |
| −22 | 148.5 | 122.1 |
| −21 | 154.4 | 127.4 |
| −20 | 160.5 | 132.9 |
| −19 | 166.7 | 138.5 |
| −18 | 173.2 | 144.4 |
| −17 | 179.9 | 150.4 |
| −16 | 186.7 | 156.7 |
| −15 | 193.8 | 163.1 |
| −14 | 201.1 | 169.8 |
| −13 | 208.6 | 176.7 |
| −12 | 216.3 | 183.8 |
| −11 | 224.2 | 191.1 |
| −10 | 232.3 | 198.7 |
| −9 | 240.7 | 206.5 |
| −8 | 249.4 | 214.5 |
| −7 | 258.2 | 222.8 |
| −6 | 267.3 | 231.4 |
| −5 | 276.7 | 240.2 |
| −4 | 286.3 | 249.3 |
| −3 | 296.2 | 258.7 |
| −2 | 306.3 | 268.3 |
| −1 | 316.7 | 278.2 |
| 0 | 327.4 | 288.4 |
| 1 | 338.4 | 298.9 |
| 2 | 349.6 | 309.8 |
| 3 | 361.1 | 320.9 |
| 4 | 373.0 | 332.3 |
| 5 | 385.1 | 344.1 |
| 6 | 397.5 | 356.1 |
| 7 | 410.2 | 368.6 |
| 8 | 423.3 | 381.3 |
| 9 | 436.6 | 394.4 |
| 10 | 450.3 | 407.9 |
| 11 | 464.3 | 421.7 |
| 12 | 475.7 | 435.8 |
| 13 | 493.3 | 450.4 |
| 14 | 508.4 | 465.3 |
| 15 | 523.7 | 480.6 |
| 16 | 539.5 | 496.3 |
| 17 | 555.6 | 512.4 |
| 18 | 572.0 | 529.0 |
| 19 | 588.8 | 545.9 |
| 20 | 606.0 | 563.2 |
| 21 | 623.6 | 581.0 |
| 22 | 641.6 | 599.2 |
| 23 | 659.9 | 617.9 |
| 24 | 678.7 | 637.0 |
| 25 | 697.8 | 656.5 |
| 26 | 717.4 | 676.6 |
| 27 | 737.3 | 697.1 |
| 28 | 757.7 | 718.0 |
| 29 | 778.5 | 739.5 |
| 30 | 799.8 | 761.4 |
| 31 | 821.4 | 783.9 |
| 32 | 843.6 | 806.8 |
| 33 | 866.1 | 830.3 |
| 34 | 889.1 | 854.3 |
| 35 | 912.6 | 878.8 |
| 36 | 936.5 | 903.9 |
| 37 | 960.9 | 929.5 |
| 38 | 985.8 | 955.7 |
| 39 | 1011.1 | 982.4 |
| 40 | 1036.9 | 1009.7 |
| 41 | 1063.2 | 1037.6 |
| 42 | 1090.0 | 1066.1 |
| 43 | 1117.3 | 1095.1 |
| 44 | 1145.2 | 1124.8 |
| 45 | 1173.5 | 11S5.1 |
| 46 | 1202.3 | 1185.9 |
| 47 | 1231.7 | 1217.5 |
| 48 | 1261.6 | 1249.6 |
| 49 | 1292.0 | 1282.4 |
| 50 | 1322.9 | 1315.8 |
| 51 | 1354.5 | 1349.9 |
| 52 | 1386.5 | 1384.7 |
| 53 | 1419.1 | 1420.1 |
| 54 | 1452.3 | 1456.2 |
| 55 | 1486.0 | 1493.0 |
| 56 | 1520.3 | 1530.5 |
| 57 | 1555.2 | 1568.7 |
| 58 | 1590.7 | 1607.6 |
| 59 | 1626.7 | 1647.3 |
| 60 | 1663.4 | 1687.6 |

TABLE 4

| Temperature/° C. | Saturated Bubble Point Vapour Pressure/kPa | |
|---|---|---|
| | Example 6 | R134a |
| −40.0 | 67.1 | 53.6 |
| −39.0 | 70.2 | 56.3 |
| −38.0 | 73.5 | 59.1 |
| −37.0 | 76.9 | 62.0 |
| −36.0 | 80.4 | 65.1 |
| −35.0 | 84.0 | 68.2 |
| −34.0 | 87.8 | 71.5 |
| −33.0 | 91.7 | 74.9 |
| −32.0 | 95.8 | 78.5 |
| −30.7 | 101.3 | 83.3 |
| −30.0 | 104.3 | 86.0 |
| −29.0 | 108.8 | 90.0 |
| −28.0 | 113.5 | 94.1 |
| −27.0 | 118.3 | 98.4 |
| −26.0 | 123.2 | 102.8 |
| −25.0 | 128.4 | 107.4 |
| −24.0 | 133.7 | 112.1 |
| −23.0 | 139.2 | 117.0 |
| −22.0 | 144.8 | 122.1 |
| −21.0 | 150.7 | 127.4 |
| −20.0 | 156.7 | 132.9 |
| −19.0 | 162.9 | 138.5 |
| −18.0 | 169.3 | 144.4 |
| −17.0 | 175.9 | 150.4 |
| −16.0 | 182.7 | 156.7 |
| −15.0 | 189.8 | 163.1 |
| −14.0 | 197.0 | 169.8 |
| −13.0 | 204.4 | 176.7 |
| −12.0 | 212.1 | 183.8 |
| −11.0 | 220.0 | 191.1 |
| −10.0 | 228.2 | 198.7 |
| −9.0 | 236.5 | 206.5 |
| −8.0 | 245.1 | 214.5 |
| −7.0 | 254.0 | 222.8 |
| −6.0 | 263.1 | 231.4 |

TABLE 4-continued

| | Saturated Bubble Point Vapour Pressure/kPa | |
|---|---|---|
| Temperature/° C. | Example 6 | R134a |
| −5.0 | 272.4 | 240.2 |
| −4.0 | 282.0 | 249.3 |
| −3.0 | 291.9 | 258.7 |
| −2.0 | 302.1 | 268.3 |
| −1.0 | 312.5 | 278.2 |
| 0.0 | 323.2 | 288.4 |
| 1.0 | 334.2 | 298.9 |
| 2.0 | 345.5 | 309.8 |
| 3.0 | 357.0 | 320.9 |
| 4.0 | 368.9 | 332.3 |
| 5.0 | 381.1 | 344.1 |
| 6.0 | 393.6 | 356.1 |
| 7.0 | 406.4 | 368.6 |
| 8.0 | 419.5 | 381.3 |
| 9.0 | 432.9 | 394.4 |
| 10.0 | 446.7 | 407.9 |
| 11.0 | 460.8 | 421.7 |
| 12.0 | 475.3 | 435.8 |
| 13.0 | 490.1 | 450.4 |
| 14.0 | 505.3 | 465.3 |
| 15.0 | 520.8 | 480.6 |
| 16.0 | 536.7 | 496.3 |
| 17.0 | 552.9 | 512.4 |
| 18.0 | 569.5 | 529.0 |
| 19.0 | 586.6 | 545.9 |
| 20.0 | 604.0 | 563.2 |
| 21.0 | 621.7 | 581.0 |
| 22.0 | 639.9 | 599.2 |
| 23.0 | 658.5 | 617.9 |
| 24.0 | 677.5 | 637.0 |
| 25.0 | 696.9 | 656.5 |
| 26.0 | 716.8 | 676.6 |
| 27.0 | 737.0 | 697.1 |
| 28.0 | 757.7 | 718.0 |
| 29.0 | 778.9 | 739.5 |
| 30.0 | 800.5 | 761.4 |
| 31.0 | 822.5 | 783.9 |
| 32.0 | 845.0 | 806.8 |
| 33.0 | 867.9 | 830.3 |
| 34.0 | 891.3 | 854.3 |
| 35.0 | 915.2 | 878.8 |
| 36.0 | 939.6 | 903.9 |
| 37.0 | 964.4 | 929.5 |
| 38.0 | 989.8 | 955.7 |
| 39.0 | 1015.6 | 982.4 |
| 40.0 | 1042.0 | 1009.7 |
| 41.0 | 1068.8 | 1037.6 |
| 42.0 | 1096.2 | 1066.1 |
| 43.0 | 1124.1 | 1095.1 |
| 44.0 | 1152.5 | 1124.8 |
| 45.0 | 1181.5 | 1155.1 |
| 46.0 | 1210.9 | 1185.9 |
| 47.0 | 1241.0 | 1217.5 |
| 48.0 | 1271.6 | 1249.6 |
| 49.0 | 1302.7 | 1282.4 |
| 50.0 | 1334.4 | 1315.8 |
| 51.0 | 1366.7 | 1349.9 |
| 52.0 | 1399.5 | 1384.7 |
| 53.0 | 1433.0 | 1420.1 |
| 54.0 | 1467.0 | 1456.2 |
| 55.0 | 1501.6 | 1493.0 |
| 56.0 | 1536.8 | 1530.5 |
| 57.0 | 1572.6 | 1568.7 |
| 58.0 | 1609.0 | 1607.6 |
| 59.0 | 1646.1 | 1647.3 |
| 60.0 | 1683.7 | 1657.6 |

TABLE 5

Comparison of Global Warming Potential

| Working Fluid | GWP (100 year ITH) |
|---|---|
| R134a | 1300 |
| Example 2 | 1116 |
| Example 3 | 1227 |
| CFC-12 | 8500 |
| Example 4 | 1576 |
| Example 5 | 1767 |
| Example 6 | 1284 |

EXAMPLE 11

The rate of cooling in a Bauknecht GKC 3333/O WS Class N freezer having a gross volume of 332 liters and a refrigerant charge of 180 g was measured using the composition of Example 1 as a refrigerant. The rate of cooling in the same domestic freezer using R134a as a refrigerant was also measured.

Thermocouples were connected to the inlet and outlet of the evaporator coil inside the freezer compartment as well as the compressor discharge line. A further thermocouple was placed inside the freezer compartment near the thermostat sensor. Pressure gauges were fitted to the suction and discharge lines and the power supply to the freezer was passed through a kilowatt hour meter.

The temperatures from the thermocouples were logged by a data logger typically at 1 minute intervals. The freezer, factory charged with R134a, was placed in a temperature controlled environment, typically 22° C.±1° C., and allowed to temperature equilibrate for at least 24 hours. The freezer and data logger were turned on and the time taken to reduce the internal freezer temperature to a level at which the thermostat cut-in was determined.

The procedure was repeated after replacing the R134a with the composition of Example 1.

Placing the freezer in a temperature controlled environment ensured that the quantity of energy which must be removed in each case to reduce the internal temperature by a given amount is approximately equivalent. A comparison of refrigerating effect can therefore be made between the two refrigerants. The faster the internal temperature reached the desired temperature, the larger the refrigeration effect. The power consumption, taken directly from the kilowatt hour meter, gives a direct comparison of the efficiency of the refrigerant composition of Example 1 compared to R134a.

The results are shown in Table 6.

EXAMPLE 12

The rate of cooling was measured in the same way as in Example 11 except that the composition of Example 2 was used in place of the composition of Example 1.

The results are shown in Table 7.

TABLE 6

| R134a | | Example 1 | |
|---|---|---|---|
| Elapsed Time | Freezer Temperature/° C. | Elapsed Time | Freezer Temperature/° C. |
| 0:00:00 | 20.62 | 0:00:00 | 21.97 |
| 0:01:00 | 17.4 | 0:01:00 | 17.5 |

TABLE 6-continued

| R134a | | Example 1 | |
|---|---|---|---|
| Elapsed Time | Freezer Temperature/° C. | Elapsed Time | Freezer Temperature/° C. |
| 0:02:00 | 12.42 | 0:02:00 | 9.91 |
| 0:03:00 | 10.55 | 0:03:00 | 7.06 |
| 0:04:00 | 9.57 | 0:04:00 | 6.07 |
| 0:05:00 | 5.58 | 0:05:00 | 5.46 |
| 0:06:00 | 4.72 | 0:06:00 | 5.1 |
| 0:07:00 | 4.47 | 0:07:00 | 4.73 |
| 0:08:00 | 4.11 | 0:08:00 | 4.37 |
| 0:09:00 | 3.62 | 0:09:00 | 3.88 |
| 0:10:00 | 3.25 | 0:10:00 | 3.51 |
| 0:11:00 | 2.77 | 0:11:00 | 3.03 |
| 0:12:00 | 2.15 | 0:12:00 | 2.53 |
| 0:13:00 | 1.66 | 0:13:00 | 2.17 |
| 0:14:00 | 1.3 | 0:14:00 | 1.81 |
| 0:15:00 | 0.94 | 0:15:00 | 1.45 |
| 0:16:00 | 0.58 | 0:16:00 | 0.95 |
| 0:17:00 | 0.22 | 0:17:01 | 0.59 |
| 0:18:00 | −0.15 | 0:18:01 | 0.1 |
| 0:19:00 | −0.53 | 0:19:01 | −0.14 |
| 0:20:00 | −0.78 | 0:20:01 | −0.65 |
| 0:21:00 | −1.29 | 0:21:01 | −1.16 |
| 0:22:00 | −1.52 | 0:22:01 | −1.54 |
| 0:23:00 | −1.9 | 0:23:01 | −2.04 |
| 0:23:59 | −2.4 | 0:24:01 | −2.42 |
| 0:24:59 | −2.64 | 0:25:01 | −2.93 |
| 0:25:59 | −3.15 | 0:26:01 | −3.3 |
| 0:27:00 | −3.54 | 0:27:01 | −3.81 |
| 0:27:59 | −3.77 | 0:28:01 | −4.19 |
| 0:28:59 | −4.15 | 0:29:01 | −4.44 |
| 0:29:59 | −4.66 | 0:30:01 | −4.93 |
| 0:30:59 | −4.89 | 0:31:01 | −5.18 |
| 0:31:59 | −5.41 | 0:32:01 | −5.56 |
| 0:32:59 | −5.66 | 0:33:01 | −5.93 |
| 0:33:59 | −5.9 | 0:34:01 | −6.18 |
| 0:34:59 | −6.28 | 0:35:01 | −6.58 |
| 0:35:59 | −6.53 | 0:36:01 | −6.87 |
| 0:36:59 | −6.91 | 0:37:01 | −7.3 |
| 0:37:59 | −7.27 | 0:38:01 | −7.74 |
| 0:38:59 | −7.52 | 0:39:01 | −8.17 |
| 0:39:59 | −7.76 | 0:40:01 | −8.47 |
| 0:40:59 | −8.28 | 0:41:01 | −8.88 |
| 0:41:59 | −8.53 | 0:42:01 | −9.15 |
| 0:42:59 | −8.91 | 0:43:01 | −9.7 |
| 0:43:59 | −9.16 | 0:44:01 | −9.96 |
| 0:44:59 | −9.66 | 0:45:01 | −10.36 |
| 0:45:59 | −9.91 | 0:46:01 | −10.75 |
| 0:46:59 | −10.03 | 0:47:02 | −11.13 |
| 0:47:59 | −10.68 | 0:48:02 | −11.39 |
| 0:48:59 | −10.66 | 0:49:02 | −11.63 |
| 0:49:59 | −11.04 | 0:50:02 | −12.02 |
| 0:50:59 | −11.3 | 0:51:02 | −12.27 |
| 0:51:59 | −11.69 | 0:52:02 | −12.65 |
| 0:52:59 | −11.85 | 0:53:02 | −13.03 |
| 0:53:59 | −12.14 | 0:54:02 | −13.14 |
| 0:54:59 | −12.31 | 0:55:02 | −13.39 |
| 0:55:59 | −12.73 | 0:56:02 | −13.77 |
| 0:56:59 | −12.9 | 0:57:02 | −14.01 |
| 0:57:59 | −13.19 | 0:58:02 | −14.28 |
| 0:58:59 | −13.46 | 0:59:02 | −14.38 |
| 0:59:59 | −13.74 | 1:00:02 | −14.77 |
| 1:00:59 | −14 | 1:01:02 | −15.13 |
| 1:01:59 | −14.25 | 1:02:02 | −15.38 |
| 1:02:59 | −14.77 | 1:03:02 | −15.63 |
| 1:03:59 | −14.75 | 1:04:02 | −15.87 |
| 1:04:59 | −15.00 | 1:05:02 | −15.99 |
| 1:05:59 | −15.25 | 1:06:02 | −16.24 |
| 1:06:59 | −15.49 | 1:07:02 | −16.37 |
| 1:07:59 | −15.74 | 1:08:02 | −16.66 |
| 1:08:59 | −15.84 | 1:09:02 | −16.82 |
| 1:09:59 | −16.22 | 1:10:02 | −16.99 |
| 1:10:59 | −16.08 | 1:11:02 | −17.29 |
| 1:11:58 | −16.33 | 1:12:02 | −17.44 |
| 1:12:59 | −16.57 | 1:13:02 | −17.72 |
| 1:13:58 | −16.82 | 1:14:02 | −17.85 |
| 1:14:59 | −17.07 | 1:15:02 | −18.13 |
| 1:15:58 | −17.30 | 1:16:02 | −18.26 |
| 1:16:58 | −17.42 | 1:17:03 | −18.53 |
| 1:17:58 | −17.54 | 1:18:03 | −18.79 |
| 1:18:58 | −17.91 | 1:19:03 | −18.91 |
| 1:19:59 | −18.03 | 1:20:03 | −19.04 |
| 1:20:58 | −18.00 | 1:21:03 | −19.16 |
| 1:21:58 | −18.25 | 1:22:03 | −19.42 |
| 1:22:58 | −18.50 | 1:23:03 | −19.66 |
| 1:23:58 | −18.61 | 1:24:03 | −19.91 |
| 1:24:58 | −18.73 | 1:25:03 | −20.03 |
| 1:25:58 | −18.98 | 1:26:03 | −20.14 |
| 1:26:58 | −18.97 | 1:27:03 | −20.27 |
| 1:27:36 | −19.21 | 1:28:03 | −20.38 |
| 1:28:36 | −19.33 | 1:29:03 | −20.36 |
| 1:29:36 | −19.45 | 1:30:03 | −20.61 |
| 1:30:37 | −19.69 | 1:31:03 | −20.72 |
| 1:31:37 | −19.81 | 1:32:03 | −20.96 |
| 1:32:37 | −19.93 | 1:33:03 | −21.08 |
| 1:33:37 | −20.04 | 1:34:03 | −21.31 |
| 1:34:37 | −20.17 | 1:35:03 | −21.55 |
| 1:35:37 | −20.19 | 1:36:03 | −21.53 |
| 1:36:37 | −20.34 | 1:37:03 | −21.64 |
| 1:37:37 | −20.38 | 1:38:03 | −21.76 |
| 1:38:37 | −20.55 | 1:39:03 | −21.74 |
| 1:39:37 | −20.72 | 1:40:03 | −21.9 |
| 1:40:37 | −20.75 | 1:41:03 | −22.07 |
| 1:41:37 | −21.02 | 1:42:03 | −22.24 |
| 1:42:37 | −21.30 | 1:43:03 | −22.26 |
| 1:43:37 | −21.30 | 1:44:03 | −22.29 |
| 1:44:37 | −21.43 | 1:45:03 | −21.26 |
| 1:45:37 | −21.54 | 1:46:03 | −20.23 |
| 1:46:37 | −21.79 | 1:47:03 | −19.73 |
| 1:47:37 | −21.91 | 1:48:04 | −19.21 |
| 1:48:37 | −22.02 | 1:49:04 | −18.95 |
| 1:49:37 | −22.13 | 1:50:04 | −18.56 |
| 1:50:37 | −22.24 | 1:51:04 | −18.15 |
| 1:51:37 | −22.35 | 1:52:04 | −18.01 |
| 1:52:37 | −22.47 | 1:53:04 | −17.88 |
| 1:53:37 | −22.44 | 1:54:04 | −18.39 |
| 1:54:37 | −22.56 | 1:55:04 | −20.06 |
| 1:55:37 | −22.67 | 1:56:04 | −20.69 |
| 1:56:37 | −22.78 | 1:57:04 | −21.07 |
| 1:57:37 | −22.89 | 1:58:04 | −21.44 |
| 1:58:38 | −23.00 | 1:59:04 | −21.82 |
| 1:59:37 | −23.11 | 2:00:05 | −21.94 |
| 2:00:38 | −23.09 | 2:01:22 | −22.3 |
| 2:02:34 | −21.76 | 2:07:22 | −21.51 |
| 2:08:34 | −19.81 | 2:13:22 | −18.67 |
| 2:14:34 | −18.12 | | |

TABLE 7

| R134a | | Example 2 | |
|---|---|---|---|
| Elapsed Time | Freezer Temperature/° C. | Elapsed Time | Freezer Temperature/° C. |
| 0:00:00 | 22.9 | 0:00:00 | 22.4 |
| 0:01:00 | 21.14 | 0:01:00 | 21.92 |
| 0:02:00 | 13.55 | 0:02:00 | 17.56 |
| 0:03:00 | 6.84 | 0:03:00 | 6.49 |
| 0:04:00 | 3.97 | 0:04:00 | 3.88 |
| 0:05:00 | 3.48 | 0:05:00 | 3.15 |
| 0:06:00 | 3.24 | 0:06:00 | 2.65 |
| 0:07:00 | 2.26 | 0:07:00 | 2.15 |
| 0:08:00 | 2.13 | 0:08:00 | 1.91 |
| 0:09:00 | 1.65 | 0:09:00 | 1.29 |
| 0:10:00 | 1.16 | 0:10:00 | 1.17 |
| 0:11:00 | 0.66 | 0:11:00 | 0.79 |
| 0:12:00 | 0.8 | 0:12:00 | 0.54 |
| 0:13:00 | 0.56 | 0:13:00 | 0:16 |

TABLE 7-continued

| R134a | | Example 2 | |
|---|---|---|---|
| Elapsed Time | Freezer Temperature/° C. | Elapsed Time | Freezer Temperature/° C. |
| 0:14:00 | 0.06 | 0:14:00 | −0.1 |
| 0:15:00 | −0.44 | 0:15:00 | −0.5 |
| 0.16.00 | −0.69 | 0:16:00 | −0.89 |
| 0:17:00 | −0.81 | 0:17:00 | −1.17 |
| 0:18:00 | −1.46 | 0:18:00 | −1.56 |
| 0:19:00 | −1.71 | 0:19:00 | −1.95 |
| 0:20:00 | −1.97 | 0:20:00 | −2.21 |
| 0:21:00 | −2.21 | 0:21:00 | −2.47 |
| 0:22:00 | −2.46 | 0:22:00 | −2.73 |
| 0:23:00 | −2.71 | 0:23:00 | −3.12 |
| 0:24:00 | −3.08 | 0:24:00 | −3.64 |
| 0:25:00 | −3.72 | 0:25:01 | −4.02 |
| 0:26:00 | −4.75 | 0:26:01 | −4.67 |
| 0:27:00 | −5.91 | 0:27:01 | −5.19 |
| 0:28:01 | −6.42 | 0:28:01 | −5.32 |
| 0:29:01 | −6.94 | 0:29:01 | −6.09 |
| 0:30:01 | −6.92 | 0:30:01 | −6.07 |
| 0:31:01 | −7.3 | 0:31:01 | −6.84 |
| 0:32:01 | −7.94 | 0:32:01 | −7.22 |
| 0:33:01 | −8.18 | 0:33:01 | −7.73 |
| 0:34:01 | −8.82 | 0:34:01 | −7.86 |
| 0:35:01 | −8.94 | 0:35:01 | −8.77 |
| 0:36:01 | −9.32 | 0:36:01 | −8.12 |
| 0:37:01 | −9.43 | 0:37:01 | −8.62 |
| 0:38:01 | −9.56 | 0:38:01 | −9.27 |
| 0:39:01 | −10.2 | 0:39:01 | −9.65 |
| 0:40:01 | −10.46 | 0:40:01 | −9.91 |
| 0:41:01 | −10.84 | 0:41:01 | −10.3 |
| 0:42:01 | −10.83 | 0:42:01 | −10.94 |
| 0:43:01 | −11.07 | 0:43:01 | −10.94 |
| 0:44:01 | −11.57 | 0:44:01 | −11.45 |
| 0:45:01 | −11.55 | 0:45:01 | −12.1 |
| 0:46:01 | −11.94 | 0:46:01 | −12.47 |
| 0:47:01 | −12.32 | 0:47:01 | −12.59 |
| 0:48:01 | −12.42 | 0:48:01 | −12.98 |
| 0:49:01 | −12.67 | 0:49:01 | −13.49 |
| 0:50:01 | −13.05 | 0:50:01 | −13.88 |
| 0:51:01 | −13.3 | 0:51:01 | −13.88 |
| 0:52:01 | −13.41 | 0:52:01 | −13.88 |
| 0:53:01 | −13.79 | 0:53:01 | −14.53 |
| 0:54:01 | −14.04 | 0:54:01 | −14.79 |
| 0:55:01 | −14.28 | 0:55:02 | −14.79 |
| 0:56:01 | −14.53 | 0:56:02 | −15.31 |
| 0:57:01 | −15.17 | 0:57:02 | −15.7 |
| 0:58:02 | −14.9 | 0:58:02 | −15.7 |
| 0:59:02 | −15.4 | 0:59:02 | −16.08 |
| 1:00:02 | −15.38 | 1:00:02 | −16.08 |
| 1:01:02 | −15.62 | 1:01:02 | −16.46 |
| 1:02:02 | −16.25 | 1:02:02 | −16.72 |
| 1:03:02 | −16.11 | 1:03:02 | −16.83 |
| 1:04:02 | −16.47 | 1:04:02 | −17.6 |
| 1:05:02 | −16.72 | 1:05:02 | −17.47 |
| 1:06:02 | −16.57 | 1:06:02 | −17.73 |
| 1:07:02 | −16.94 | 1:07:02 | −17.46 |
| 1:08:02 | −17.18 | 1:08:02 | −18.24 |
| 1:09:02 | −17.43 | 1:09:02 | −18.63 |
| 1:10:02 | −17.56 | 1:10:02 | −18.76 |
| 1:11:02 | −17.55 | 1:11:02 | −18.49 |
| 1:12:02 | −18.06 | 1:12:02 | −18.88 |
| 1:13:02 | −18.3 | 1:13:02 | −19.01 |
| 1:14:02 | −18.29 | 1:14:02 | −19.12 |
| 1:15:02 | −18.41 | 1:15:02 | −19.12 |
| 1:16:02 | −18.65 | 1:16:02 | −19.9 |
| 1:17:02 | −18.51 | 1:17:02 | −20.02 |
| 1:18:02 | −19.03 | 1:18:02 | −20.01 |
| 1:19:02 | −19.26 | 1:19:02 | −20.01 |
| 1:20:02 | −19 | 1:20:02 | −20.14 |
| 1:21:02 | −19.38 | 1:21:02 | −20.53 |
| 1:22:02 | −19.76 | 1:22:02 | −20.66 |
| 1:23:02 | −19.75 | 1:23:02 | −20.51 |
| 1:24:02 | −19.99 | 1.24.02 | −21.17 |
| 1:25:02 | −19.99 | 1:25:02 | −20.91 |
| 1:26:02 | −20.12 | 1:26:03 | −20.91 |
| 1:27:02 | −20.41 | 1:27:03 | −20.91 |
| 1:28:03 | −20.7 | 1:28:03 | −21.43 |
| 1:29:03 | −20.85 | 1:29:03 | −21.56 |
| 1:30:03 | −20.91 | 1:30:03 | −21.82 |
| 1:31:03 | −21.07 | 1:31:03 | −22.08 |
| 1:32:03 | −20.85 | 1:32:03 | −22.19 |
| 1:33:03 | −21.14 | 1:33:03 | −22.58 |
| 1:34:03 | −21.41 | 1:34:03 | −22.31 |
| 1:35:03 | −21.41 | 1:35:04 | −22.43 |
| 1:36:03 | −21.56 | 1:36:04 | −22.67 |
| 1:37:03 | −21.69 | 1:37:04 | −22.93 |
| 1:38:03 | −21.8 | 1:38:04 | −22.92 |
| 1:39:03 | −21.67 | 1:39:04 | −22.91 |
| 1:40:03 | −21.53 | 1:40:04 | −23.16 |
| 1:41:03 | −22.04 | 1:41:04 | −23.01 |
| 1:42:03 | −22.16 | 1:42:04 | −23.27 |
| 1:43:03 | −22.27 | 1:43:04 | −22.87 |
| 1:44:03 | −22.26 | 1:44:04 | −21.83 |
| 1:45:03 | −22.53 | 1:45:04 | −20.38 |
| 1:46:03 | −22.68 | 1:46:04 | −19.47 |
| 1:47:03 | −22.81 | 1:47:04 | −18.69 |
| 1:48:03 | −22.92 | 1:48:04 | −18.44 |
| 1:49:03 | −22.91 | 1:49:04 | −18.18 |
| 1:50:03 | −23.16 | 1:50:04 | −18.44 |
| 1:51:03 | −23.26 | 1:51:04 | −19.5 |
| 1:52:03 | −23.36 | 1:52:04 | −21.06 |
| 1:53:03 | −23.61 | 1:53:04 | −21.46 |
| 1:54:03 | −23.46 | 1:54:04 | −21.98 |
| 1:55:03 | −23.56 | 1:55:04 | −22.11 |
| 1:56:03 | −23.94 | 1:56:04 | −22.37 |
| 1:57:03 | −23.39 | 1:57:04 | −22.65 |
| 1:58:04 | −22.21 | 1:58:04 | −22.78 |
| 1:59:04 | −21.01 | 1:59:04 | −23.17 |
| 2:00:04 | −20.46 | 2:00:04 | −23.3 |

EXAMPLE 13

The rate of cooling was measured in the same way as in Example 11, except that the composition of Example 6 was used in place of the composition of Example 1.

The results are shown in Table 8.

EXAMPLE 14

The maximum and minimum cabinet temperature, average evaporator and condenser pressure, average compressor discharge temperature and average power consumption of the freezer used in Example 11, using the composition of Example 2 as a refrigerant, were measured while the freezer was running.

Similar measurements were taken with the same freezer using R134a as a refrigerant.

Thermocouples were connected to the inlet and outlet of the evaporator coil inside the freezer compartment as well as the compressor discharge line. A further thermocouple was placed inside the freezer compartment near the thermostat sensor. Pressure gauges were fitted to the suction and discharge lines and the power supply to the freezer was passed through a kilowatt hour meter.

The temperatures from the thermocouples were logged by a data logger typically at 1 minute intervals.

The freezer, factory charged with R134a, was placed in a temperature controlled environment, typically 22° C.±1° C.,

TABLE 8

| R134a | | Example 6 | |
|---|---|---|---|
| Elapsed Time | Freezer Temperature/° C. | Elapsed Time | Freezer Temperature/° C. |
| 0:00:00 | 20.62 | 0:00:00 | 23.13 |
| 0:01:00 | 17.40 | 0:01:00 | 21.15 |
| 0:02:00 | 12.42 | 0:02:00 | 15.93 |
| 0:03:00 | 10.55 | 0:03:00 | 11.09 |
| 0:04:00 | 9.57 | 0:04:00 | 8.61 |
| 0:05:00 | 5.58 | 0:05:00 | 6.63 |
| 0:06:00 | 4.72 | 0:06:00 | 6.50 |
| 0:07:00 | 4.47 | 0:07:00 | 5.85 |
| 0:08:00 | 4.11 | 0:08:00 | 5.42 |
| 0.09:00 | 3.62 | 0:09:00 | 5.01 |
| 0:10:00 | 3.25 | 0:10:00 | 4.49 |
| 0:11:00 | 2.77 | 0:11:00 | 3.97 |
| 0.12:00 | 2.15 | 0:12:00 | 3.46 |
| 0:13:00 | 1.66 | 0:13:00 | 2.94 |
| 0:14:00 | 1.30 | 0:14:00 | 2.45 |
| 0:15:00 | 0.94 | 0:15:00 | 1.95 |
| 0:16:00 | 0.58 | 0:16:00 | 1.71 |
| 0:17:00 | 0.22 | 0:17:00 | 1.21 |
| 0:18:00 | −0.15 | 0:18:00 | 0.99 |
| 0:19:00 | −0.53 | 0:19:00 | 0.63 |
| 0:20:00 | −0.78 | 0:20:00 | 0.14 |
| 0:21:00 | −1.29 | 0:21:00 | −0.22 |
| 0:22:00 | −1.52 | 0:22:00 | −0.58 |
| 0:23:00 | −1.90 | 0:23:00 | −0.83 |
| 0:23:59 | −2.40 | 0:24:00 | −1.22 |
| 0:24:59 | −2.64 | 0:25:00 | −1.51 |
| 0:25:59 | −3.15 | 0:26:01 | −1.94 |
| 0:27:00 | −3.54 | 0:27:01 | −2.37 |
| 0:27:59 | −3.77 | 0:28:01 | −2.80 |
| 0:28:59 | −4.15 | 0:29:01 | −3.20 |
| 0:29:59 | −4.66 | 0:30:01 | −3.75 |
| 0:30:59 | −4.89 | 0:31:01 | −4.14 |
| 0:31:59 | −5.41 | 0:32:01 | −4.53 |
| 0:32:59 | −5.65 | 0:33:01 | −5.05 |
| 0:33:59 | −5.90 | 0:34:01 | −5.56 |
| 0:34:59 | −6.28 | 0:35:01 | −5.80 |
| 0:35:59 | −6.53 | 0:36:01 | −6.18 |
| 0:36:59 | −6.91 | 0:37:01 | −6.41 |
| 0:37:59 | −7.27 | 0:38:01 | −6.78 |
| 0:38:59 | −7.52 | 0:39:01 | −7.14 |
| 0:39:59 | −7.76 | 0:40:01 | −7.36 |
| 0:40:59 | −8.28 | 0:41:01 | −7.61 |
| 0:41:59 | −8.53 | 0:42:01 | −8.01 |
| 0:42:59 | −8.91 | 0:43:01 | −8.17 |
| 0:43:59 | −9.16 | 0:44:01 | −8.60 |
| 0:44:59 | −9.66 | 0:45:01 | −8.90 |
| 0:45:59 | −9.91 | 0:46:01 | −9.21 |
| 0:46:59 | −10.03 | 0:47:01 | −9.64 |
| 0:47:59 | −10.68 | 0:48:01 | −9.93 |
| 0:48:59 | −10.66 | 0:49:01 | −10.20 |
| 0:49:59 | −11.04 | 0:50:01 | −10.61 |
| 0:50:59 | −11.30 | 0:51:01 | −11.01 |
| 0:51:59 | −11.69 | 0:52:01 | −11.53 |
| 0:52:59 | −11.85 | 0:53:01 | −11.65 |
| 0:53:59 | −12.14 | 0:54:01 | −12.04 |
| 0:54:59 | −12.31 | 0:55:01 | −12.41 |
| 0:55:59 | −12.73 | 0:56:02 | −12.52 |
| 0:56:59 | −12.90 | 0:57:02 | −12.89 |
| 0:57:59 | −13.19 | 0:58:02 | −13.14 |
| 0:58:59 | −13.46 | 0:59:02 | −13.38 |
| 0:59:59 | −13.74 | 1:00:02 | −13.74 |
| 1:00:59 | −14.00 | 1:01:02 | −13.97 |
| 1:01:59 | −14.25 | 1:02:02 | −13.96 |
| 1:02:59 | −14.77 | 1:03:02 | −14.10 |
| 1:03:59 | −14.75 | 1:04:02 | −14.26 |
| 1:04:59 | −15.00 | 1:05:02 | −14.56 |
| 1:05:59 | −15.25 | 1:06:02 | −14.87 |
| 1:06:59 | −15.49 | 1:07:02 | −15.17 |
| 1:07:59 | −15.74 | 1:08:02 | −15.33 |
| 1:08:59 | −15.84 | 1:09:02 | −15.49 |
| 1:09:59 | −16.22 | 1:10:02 | −15.89 |
| 1:10:59 | −16.08 | 1:11:02 | −16.02 |
| 1:11:58 | −16.33 | 1:12:02 | −16.28 |
| 1:12:59 | −16.57 | 1:13:02 | −16.53 |

TABLE 8-continued

| R134a | | Example 6 | |
|---|---|---|---|
| Elapsed Time | Freezer Temperature/° C. | Elapsed Time | Freezer Temperature/° C. |
| 1:13:58 | −16.82 | 1:14:02 | −16.92 |
| 1:14:59 | −17.07 | 1:15:02 | −17.03 |
| 1:15:58 | −17.30 | 1:16:02 | −17.28 |
| 1:16:58 | −17.42 | 1:17:02 | −17.38 |
| 1:17:58 | −17.54 | 1:18:02 | −17.62 |
| 1:18:58 | −17.91 | 1:19:02 | −17.72 |
| 1:19:59 | −18.03 | 1:20:02 | −17.96 |
| 1:20:58 | −18.00 | 1:21:02 | −17.93 |
| 1:21:58 | −18.25 | 1:22:02 | −18.19 |
| 1:22:58 | −18.50 | 1:23:03 | −18.20 |
| 1:23:58 | −18.61 | 1:24:03 | −18.37 |
| 1:24:58 | −18.73 | 1:25:02 | −18.54 |
| 1:25:58 | −18.98 | 1:26:03 | −18.60 |
| 1:26:58 | −18.97 | 1:27:03 | −18.88 |
| 1:27:36 | −19.21 | 1:28:03 | −19.17 |
| 1:28:36 | −19.33 | 1:29:03 | −19.18 |
| 1:29:36 | −19.45 | 1:30:03 | −19.44 |
| 1:30:37 | −19.69 | 1:31:03 | −19.70 |
| 1:31:37 | −19.81 | 1:32:04 | −19.83 |
| 1:32:37 | −19.93 | 1:33:04 | −19.95 |
| 1:33:37 | −20.04 | 1:34:04 | −20.20 |
| 1:34:37 | −20.17 | 1:35:04 | −20.31 |
| 1:35:37 | −20.19 | 1:36:04 | −20.42 |
| 1:36:37 | −20.34 | 1:37:04 | −20.65 |
| 1:37:37 | −20.38 | 1:38:04 | −20.77 |
| 1:38:37 | −20.55 | 1:39:04 | −21.00 |
| 1:39:37 | −20.72 | 1:40:04 | −20.98 |
| 1:40:37 | −20.75 | 1:41:04 | −21.21 |
| 1:41:37 | −21.02 | 1:42:04 | −21.31 |
| 1:42:37 | −21.30 | 1:43:04 | −21.31 |
| 1:43:37 | −21.30 | 1:44:04 | −21.33 |
| 1:44:37 | −21.43 | 1:45:04 | −21.47 |
| 1:45:37 | −21.54 | 1:46:04 | −21.38 |
| 1:46:37 | −21.79 | 1:47:04 | −21.54 |
| 1:47:37 | −21.91 | 1:48:04 | −21.69 |
| 1:48:37 | −22.02 | 1:49:04 | −21.98 |
| 1:49:37 | −22.13 | 1:50:04 | −22.12 |
| 1:50:37 | −22.24 | 1:51:04 | −22.12 |
| 1:51:37 | −22.35 | 1:52:04 | −22.24 |
| 1:52:37 | −22.47 | 1:53:04 | −22.50 |
| 1:53:37 | −22.44 | 1:54:04 | −22.60 |
| 1:54:37 | −22.56 | 1:55:04 | −22.72 |
| 1:55:37 | −22.67 | 1:56:04 | −22.95 |
| 1:56:37 | −22.78 | 1:57:04 | −22.93 |
| 1:57:37 | −22.89 | 1:58:04 | −23.03 |
| 1:58:38 | −23.00 | 1:59:04 | −22.48 |
| 1:59:37 | −23.11 | 2:00:04 | −21.29 |
| 2:00:38 | −23.09 | 2:01:04 | −20.51 |
| 2:02:34 | −21.76 | 2:02:04 | −20.00 |
| 2:08:34 | −19.81 | 2:03:04 | −19.51 |
| 2:14:34 | −18.12 | 2:04:05 | −19.02 |
| | | 2:05:05 | −18.67 | and allowed to temperature equilibrate for at least 24 hours. The freezer and data logger were turned on and the performance characteristics specified above were recorded over a period of at least 30 hours.

The procedure was repeated after replacing the R134a with the composition of Example 2.

The results are shown in Table 9.

TABLE 9

| Ambient temperature 23° C. | | |
|---|---|---|
| Parameter | R134a | Example 2 |
| Maximum cabinet temperature/° C. | −18.4 | −18.3 |
| Minimum cabinet temperature/° C. | −23.8 | −23.6 |

TABLE 9-continued

Ambient temperature 23° C.

| Parameter | R134a | Example 2 |
|---|---|---|
| †Average evaporator pressure/psi.a | 4.5 | 6.6 |
| †Average Condenser pressure/psi.a | 150 | 150 |
| †Average compressor discharge temperature/° C. | 87 | 89 |
| Average power consumption/W.hr$^{-1}$ | 60.7 | 58.4 |

†During on cycle

What is claimed is:

1. A non-azeotropic refrigerant composition having a vapor pressure at −20° C. of from 70 to 190 kPa (0.7 to 1.9 bar), at +20° C. of from 510 to 630 kPa (5.1 to 6.3 bar) and at +60° C. of from 1620 to 1740 kPa (16.2 to 17.4 bar), which composition comprises:
   (a) 1,1,2,2-tetrafluoroethane (R134), 1,1,1,2-tetrafluoroethane (R134a), difluoromethoxytrifluoromethane (E125) or a mixture of two or more thereof, in an amount of from 60 to 95% by weight, based on the weight of the composition;
   (b) from 1 to 10% by weight, based on the weight of the composition, of an unsubstituted hydrocarbon of the formula C$_n$H$_m$ in which n is from 4 to 6 and m is at least 2n−2; and,
   (c) a vapor pressure depressant comprising at least one of 1,1-difluoroethane, 1,1,1,2,2-pentafluoropropane, 1,1,2,2,3-pentafluoropropane, trifluoromethoxymethane, fluoromethoxytrifluoromethane, difluoromethoxymethane, pentafluoroethoxypentafluoroethane, difluoromethoxydifluoromethane, trifluoromethoxy-2,2,2-trifluoroethane, fluoromethoxymethane, difluoromethoxy-1,2,2,2-tetrafluoroethane, fluoromethoxyfluoromethane, difluoromethoxy-2,2,2-trifluoroethane, methoxy-2,2,2-trifluoroethane, and methoxy-1,1,2,2-tetrafluoroethane.

2. A composition according to claim 1 wherein component (b) is fully saturated except for one double bond.

3. A composition according to claim 1 wherein component (b) is methylenecyclopropane, 1-butene, cis-2-butene, trans-2-butene, butane, 2-methyl propane, cyclopentene, cyclopentane, 2-methyl-1-butene, 2-methyl-2-butene, 3-methyl-1-butene, 1-pentene, cis-2-pentene, trans-2-pentene, 2-methylbutane, pentane or a mixture of two or more thereof.

4. A composition according to claim 1, which, in the temperature range of −30° C. to +60° C., has a vapor pressure different from the vapor pressure of 1,1,1,2-tetrafluoroethane (R134a) by an amount not greater than 60 kPa (0.6 bar).

5. A composition according to claim 1, in which component (a) is present in an amount of from 70 to 95% by weight, based on the weight of the composition, component (b) is present in an amount of from 1 to 8% by weight, based on the weight of the composition, and component (c) is present in an amount of from 4 to 29% by weight, based on the weight of the composition.

6. A composition according to claim 1, in which component (a) is present in an amount of from 80 to 90% by weight, based on the weight of the composition, component (b) is present in an amount of from 2 to 6% by weight, based on the weight of the composition, and component (c) is present in an amount of from 8 to 18% by weight, based on the weight of the composition.

7. A composition according to claim 1, in which component (a) is present in an amount of from 82 to 86% by weight, based on the weight of the composition, component (b) is present in an amount of from 2 to 5% by weight, based on the weight of the composition, and component (c) is present in an amount of from 12 to 16% by weight, based on the weight of the composition.

8. A composition according to claim 1, further comprising component (d), a flammability suppressant comprising at least one of 1,1,1,2,2,3,3-heptafluoropropane, 1,1,1,2,3,3,3-heptafluoropropane, octafluorocyclobutane, octafluoropropane, trifluoromethoxytrifluoromethane, difluoromethoxytrifluoromethane, trifluoromethoxypentafluoroethane, difluoromethoxypentafluoroethane, and trifluoromethoxy-1,2,2,2-tetrafluoroethane.

9. A composition according to claim 8, in which component (c) is present in an amount up to 19% by weight, based on the weight of the composition, and component (d) is present in an amount up to 20% by weight, based on the weight of the composition.

10. A composition according to claim 1 wherein component (b) is fully saturated.

11. A composition according to claim 9, in which the component (d) is 1,1,1,2,2,3,3-heptafluoropropane, 1,1,1,2,3,3,3-heptafluoropropane, octafluorocyclobutane, octafluoropropane, trifluoromethoxytrifluoromethane, difluoromethoxytrifluoromethane, trifluoromethoxypentafluoroethane, difluoromethoxypentafluoroethane, trifluoromethoxy-1,2,2,2-tetrafluoroethane, or a mixture of two or more thereof.

12. A composition according to claim 1 wherein the ratio of the total number of fluorine atoms in the composition to the total number of hydrogen atoms in the composition is at least 1.25:1.

13. A composition according to claim 1 in which
   component (a) is 1,1,2,2-tetrafluoroethane (R134) or 1,1,1,2-tetrafluoroethane (R134a), or a combination of 1,1,2,2-tetrafluoroethane (R134) and 1,1,1,2-tetrafluoroethane (R134a);
   component (b) is n-butane (R600) or 2-methyl-propane (R600a), or a combination of n-butane (R600) and 2-methyl-propane (R600a); and
   component (c) is 1,1-difluoroethane (R152a).

14. A composition according to claim 1 in which component (c) is 1,1-difluoroethane (R152a).

15. A process for producing refrigeration, comprising condensing a composition as claimed in claim 1 and thereafter evaporating the composition in the vicinity of a body to be cooled.

16. A compression refrigeration apparatus containing, as refrigerant, a composition as claimed in claim 1.

17. A composition according to claim 1, in which the vapor pressure depressant is also a flammability suppressant.

18. A composition according to claim 8, in which the flammability suppressant is also a vapor pressure depressant.

19. A method for operating a compression refrigeration apparatus, comprising employing as a refrigerant in said apparatus not more than 1 kg of a composition as claimed in claim 1.

20. A non-azeotropic refrigerant composition having a vapor pressure at −20° C. of from 70 to 190 kPa (0.7 to 1.9 bar), at +20° C. of from 510 to 630 kPa (5.1 to 6.3 bar) and at +60° C. of from 1620 to 1740 kPa (16.2 to 17.4 bar), which composition comprises:

(a) 1,1,2,2-tetrafluoroethane (R134), 1,1,1,2-tetrafluoroethane (R134a), difluoromethoxytrifluoromethane (E125) or a mixture of two or more thereof, in an amount of from 60 to 95% by weight, based on the weight of the composition;

(b) from 1 to 10% by weight, based on the weight of the composition, of an unsubstituted hydrocarbon of the formula $C_nH_m$ in which n is from 4 to 6 and m is at least 2n−2; and, (c) at least one of 1,1,1,2,2,3,3-heptafluoropropane, 1,1,1,2,3,3,3-heptafluoropropane, octafluorocyclobutane, trifluoromethoxypentafluoroethane, difluoromethoxypentafluoroethane, and trifluoromethoxy-1,2,2,2-tetrafluoroethane.

21. A composition according to claim 20, in which component (c) is 1,1,1,2,2,3,3-heptafluoropropane, 1,1,1,2,3,3,3-heptafluoropropane, or a mixture thereof.

22. A composition according to claim 20 in which component (c) is 1,1,1,2,2,3,3-heptafluoropropane (R227ca) or 1,1,1,2,3,3,3-heptafluoropropane (R227ea) or a combination thereof.

23. A non-azeotropic refrigerant composition having a vapor pressure at −20° C. of from 70 to 190 kPa (0.7 to 1.9 bar), at +20° C. of from 510 to 630 kPa (5.1 to 6.3 bar) and at +60° C. of from 1620 to 1740 kPa (16.2 to 17.4 bar), which composition comprises:

(a) 1,1,2,2-tetrafluoroethane (R134), 1,1,1,2-tetrafluoroethane (R134a), difluoromethoxytrifluoromethane (E125) or a mixture of two or more thereof, in an amount of more than 95% by weight, based on the weight of the composition;

(b) at least 1% by weight, based on the weight of the composition, of an unsubstituted hydrocarbon of the formula $C_nH_m$ in which n is from 4 to 6 and m is at least 2n−2; and, (c) at least one of 1,1-difluoroethane, 1,1,1,2,2,3,3-heptafluoropropane, 1,1,1,2,3,3,3-heptafluoropropane, octafluorocyclobutane, 1,1,1,2,2-pentafluoropropane, 1,1,2,2,3-pentafluoropropane, trifluoromethoxymethane, trifluoromethoxypentafluoroethane, difluoromethoxypentafluoroethane, trifluoromethoxy-1,2,2,2-tetrafluoroethane, fluoromethoxytrifluoromethane, difluoromethoxymethane, pentafluoroethoxypentafluoroethane, difluoromethoxydifluoromethane, trifluoromethoxy-2,2,2-trifluoroethane, fluoromethoxymethane, difluoromethoxy-1,2,2,2-tetrafluoroethane, fluoromethoxyfluoromethane, difluoromethoxy-2,2,2-trifluoroethane, methoxy-2,2,2-trifluoroethane, and methoxy-1,1,2,2-tetrafluoroethane.

24. A non-azeotropic refrigerant composition having a vapor pressure at −20° C. of from 70 to 190 kPa (0.7 to 1.9 bar), at +20° C. of from 510 to 630 kPa 5.1 to 6.3 bar) and at +60° C. of from 1620 to 1740 kPa (16.2 to 17.4 bar), which composition comprises:

(a) 1,1,2,2-tetrafluoroethane (R134), 1,1,1,2-tetrafluoroethane (R134a), difluoromethoxytrifluoromethane (E125) or a mixture of two or more thereof, in an amount of less than 99%, but not less than 60%, by weight, based on the weight of the composition;

(b) from 1 to 10% by weight, based on the weight of the composition, of an unsubstituted hydrocarbon of the formula $C_nH_m$ in which n is from 4 to 6 and m is at least 2n−2; and, (c) at least one of 1,1-difluoroethane, 1,1,1,2,2,3,3-heptafluoropropane, 1,1,1,2,3,3,3-heptafluoropropane, octafluorocyclobutane, 1,1,1,2,2-pentafluoropropane, 1,1,2,2,3-pentafluoropropane, trifluoromethoxymethane, trifluoromethoxypentafluoroethane, difluoromethoxypentafluoroethane, trifluoromethoxy-1,2,2,2-tetrafluoroethane, fluoromethoxytrifluoromethane, difluoromethoxymethane, pentafluoroethoxypentafluoroethane, difluoromethoxydifluoromethane, trifluoromethoxy-2,2,2-trifluoroethane, fluoromethoxymethane, difluoromethoxy-1,2,2,2-tetrafluoroethane, fluoromethoxyfluoromethane, difluoromethoxy-2,2,2-trifluoroethane, methoxy-2,2,2-trifluoroethane, and methoxy-1,1,2,2-tetrafluoroethane.

\* \* \* \* \*

UNITED STATES PATENT AND TRADEMARK OFFICE
CERTIFICATE OF CORRECTION

PATENT NO.   : 6,521,141 B1
DATED        : February 18, 2003
INVENTOR(S)  : Neil A. Roberts It is certified that error appears in the above-identified patent and that said Letters Patent is hereby corrected as shown below:

<u>Title page,</u>
Item [57], ABSTRACT,
Line 9, "990" should read -- 99% --.

<u>Column 22,</u>
Line 13, "5.1 to 6.3 bar)" should read -- (5.1 to 6.3 bar) --.

Signed and Sealed this

Fifteenth Day of April, 2003

JAMES E. ROGAN
*Director of the United States Patent and Trademark Office*